US007836965B2

(12) United States Patent
Korenkov et al.

(10) Patent No.: US 7,836,965 B2

(45) Date of Patent: Nov. 23, 2010

(54) METHOD AND DEVICE FOR CONTROLLING AND/OR PUTTING OUT FIRES

(75) Inventors: Vladimir Vladimirovich Korenkov, Moscow (RU); Aleksei Andreevich Tereshin, Moscow (RU); Nikolai Andreevich Suprunov, Moscow (RU); Nikolai Konstantinovich Garnov, Moscow (RU); Vasily Nikolaevich Melkov, Verkhny Mikhailovsky proezd (RU); Vladimir Fedorovich Vlasov, Moscow (RU); Nikolai Petrovich Kopylov, Moscovskaya oblast (RU); Sergei Georgievich Tsarichenko, Moscow (RU)

(73) Assignees: Federal State Unitary Enterprise State Research and Production Enterprise "Bazalt", Moscow (RU); Federal State Institution Federal Agency for Legal Protection of Military, Special and Dual Use Intellectual Activity Results under Ministry of Justice of the Russian Federation, Moscow (RU)

( * ) Notice: Subject to any disclaimer, the term of this patent is extended or adjusted under 35 U.S.C. 154(b) by 866 days.

(21) Appl. No.: 10/588,317

(22) PCT Filed: Jan. 13, 2005

(86) PCT No.: PCT/RU2005/000007

§ 371 (c)(1), (2), (4) Date: Dec. 29, 2006

(87) PCT Pub. No.: WO2005/075025

PCT Pub. Date: Aug. 18, 2005

(65) Prior Publication Data

US 2008/0271900 A1 Nov. 6, 2008

(30) Foreign Application Priority Data

Feb. 10, 2004 (RU) .............................. 2004103576
Mar. 11, 2004 (RU) .............................. 2004106767

(51) Int. Cl.
*A62C 35/02* (2006.01)
*A62C 2/00* (2006.01)
*F42C 15/00* (2006.01)
*B64D 1/04* (2006.01)

(52) U.S. Cl. ............................. 169/28; 169/46; 169/36; 169/35; 102/221; 102/489; 102/370; 89/1.51; 89/1.54; 89/1.58; 89/1.59

(58) Field of Classification Search ................... 169/28, 169/36, 46, 81, 26, 35; 102/221, 489, 370; 89/1.51, 1.52, 1.53, 1.54, 1.55, 1.58, 1.59
See application file for complete search history.

(56) References Cited

U.S. PATENT DOCUMENTS

| | | | | |
|---|---|---|---|---|
| 1,903,348 | A * | 4/1933 | Anderson | 102/369 |
| 2,462,744 | A * | 2/1949 | Hasselhorn | 89/1.58 |
| 2,779,421 | A | 1/1957 | Rust | |
| 2,786,392 | A * | 3/1957 | Niedling | 89/1.58 |
| 3,382,800 | A * | 5/1968 | Biggs, Jr. | 102/369 |
| 4,651,648 | A * | 3/1987 | Alon | 102/387 |
| 4,932,325 | A * | 6/1990 | Hutter | 102/223 |
| 5,585,596 | A * | 12/1996 | Richards et al. | 102/378 |
| 6,142,424 | A * | 11/2000 | Wagner | 244/158.5 |
| 6,470,805 | B1 * | 10/2002 | Woodall et al. | 102/370 |
| 6,622,971 | B1 * | 9/2003 | Robertson | 244/171.1 |
| 7,082,878 | B2 * | 8/2006 | Facciano et al. | 102/377 |
| 7,121,353 | B2 * | 10/2006 | Setzer | 169/28 |
| 7,478,680 | B2 * | 1/2009 | Sridharan et al. | 169/36 |

FOREIGN PATENT DOCUMENTS

| | | |
|---|---|---|
| RU | 2050875 | 12/1995 |
| RU | 2111032 | 5/1998 |
| RU | 2146544 | 4/1999 |
| WO | 97/06858 | 2/1997 |

* cited by examiner

*Primary Examiner*—Len Tran
*Assistant Examiner*—Justin Jonaitis

(74) *Attorney, Agent, or Firm*—Locke Lord Bissell & Liddell LLP

(57) ABSTRACT

The object of the inventive method and device for controlling and/or extinguishing fires is to extend the range of means for transporting devices to a fire site, substantially reduce the time for the operating preparation thereof and to exclude a fragmentation field caused by the device explosion which ensures the momentary conversion of a fire-extinguishing composition into a fine cloud associated with a simultaneous airblast effect produced to a fire area and a maximum distribution of said fire-extinguishing composition through the fire volume. Said method for controlling and/or putting out a fire consists in effecting the fire area by an airblast and the high-speed flow of the air-dispersed mixture of the fire-extinguishing composition (7) produced by the explosion of a fire-suppressing device (2) which comprises a dispersing charge (8) and a container (6) with the fire-extinguishing composition (7). The container is provided with structural elements for transporting the fire-suppressing device (2) to the fire site and/or for placing said device on a fire travel path, said structural elements being detached from the container (6) prior to the dispersing charge (8) explosion. The fire-suppressing device (2) for carrying out said method comprises the container (6) with the fire-extinguishing composition (7) and a dispersing charge (8), a blasting fuse (9) and a stabilizer (10). Said device also comprises a suspension system (3) which is provided with releasing mechanism (15) and force-separating elements (16), mounted on the external surface of the container (6) symmetrically to a plane passing through the device center-of-mass, is embodied in the form of container (6) embracing elements which are spaced from each other and rigidly connected by means of a faceplate (12) provided with hasps (13) and connected to the stabilizer (10) bottom by a flexible connection (14).

9 Claims, 5 Drawing Sheets

A-A

METHOD AND DEVICE FOR CONTROLLING AND/OR PUTTING OUT FIRES

TECHNICAL FIELD

The invention relates to the fire-fighting means and, more particularly, the invention relates to a method and device for localization and/or suppression of fires and can be used for efficient extinguishing large-scale and powerful fires including wood and forest-steppe fires, as well as fires originating in adverse terrain both geographically (abrupt mountains, an impassable taiga, jungle) and owing to close position of a source of danger (explosions, high temperature).

PRIOR ART

To extinguish wood fires (crowning or combined), wide use is made of methods based on creation of fire-prevention firewalls by means of a common effect of a system of local explosions and sprinkling fire-extinguishing compositions for an extended period of time.

One of the known methods of localization and suppression of fires consists in delivery of fire-suppressing devices with the help of a mobile missile assembly of valley fire (SU, 1789232).

The fire-suppressing device realizing this known method is made as a shell to be shoot from a mobile missile assembly of ground or air basing.

The shell has a body made of two halves opening at the blast of a central charge of an explosive material disposed along the shell axis and acted on by a signal of a heat sensor located in the front part of the shell. Arranged about the central charge is a composite system in the form of two interconnected elements with an explosive material and a fire-extinguishing agent, and these interconnected elements are disposed in succession one after another along a single axis as a parcel. All elements of the composite system have their own heat or inertia sensors. The body halves are provided with brake devices (parachutes) to ensure a safe landing, and in the shell ground part has a jet engine.

The fire-fighting method consists in the following. When the shell approaches the fire front, a signal of the front heat sensor initiates the central charge of explosive material, and the body halves are released and dropped on parachutes. The packets of elements are released simultaneously and at their free fall reach the fire zones. A part of these elements is intended for extinguishing ground fires and is provided with inertia sensors operating at the impact with the ground. The other part of the elements is initiated in wood cover from the heat sensors adjusted to different temperature thresholds. It is assumed that such a complex effect or a combination of a system of local explosions and sprinkling fire-extinguishing agents extended in time will provide efficient fire extinguishing.

This method and the device effecting said method have a number of significant disadvantages which reduce their efficiency and increase the operating cost. The presence of two types of components (a central charge of an explosive material and a fire-extinguishing agent with a charge of an explosive material) and their successive initiation causes an effect on the fire air impact wave separated by place and time. It can promote a repeated inflammation on separate sites and probably further development of a fire, because on these sites the flame is only forced down, and the center is not isolated and is not cooled by the fire-extinguishing agent.

The usage of systems of valley fire for delivery of components to a fire zone also decreases the efficiency of the method, because a fixed caliber of rockets and shells assumes mandatory presence of auxiliary devices (a motor, a central charge for opening the body, a parachute). A low value of the filling factor of the delivery device expressed as a ratio of the useful mass (fire-extinguishing agent and charges of explosive material) to the total mass of the delivery device considerably increases the fire-fighting expenses.

Besides, when using the valley fire systems, the aiming is effected by areas, and this can be ineffective for localization of a fire since in this case, first of all, it is necessary to stop the advance of the fire front (line of fire), instead of suppressing the flame on the whole fire area.

A significant disadvantage of the known method is a high danger of pollution and damage of the environment by the numerous remnants of the metallic body and components formed during the explosion.

Another danger is mining of the fire area with non-exploded components with a charge of explosive since there is no duplicated sensors causing a blast of the elements reaching the ground.

Another known method of localization and suppression of fires, mainly wood fires, is also based on the use of an air shock wave in front of a fire line for the purpose of creation of a high pressure zone extended in height and width (SU, 1834667).

This known method consists in placing set of fire-suppressing devices and detonating charges in a wood cover along the movement of the fire front. Each fire-suppressing device is filled with a liquid fuel and is provided with a dispersing charge. Near the fire front the operator sends control signals to operate the fire-suppressing devices in succession by blasting the dispersing charge and forming a fine air-and-fuel cloud. After a dozens of milliseconds this cloud is exploded with the help of detonating charges, thereby forming an air shock wave forcing down easily burning objects, small branches, dry foliage, grass, and suppressing the flame of the ground fire and forming a fire-prevention band.

The used fire-suppressing device is made in the form of a container accommodating a dispersing charge surrounded by liquid hydrocarbon fuel (for example, ethylene oxide). The initiator of the dispersing charge explosion is connected to an electric circuit forming a control signal and disposed at the command center. This circuit also sends a control signal for explosion of detonating charge.

This method is applicable only for creation of control lines on the paths of a ground fire of low power. The method is most efficient at localization of prairie fire and bush fire. In so doing the fire is only localized but not suppressed and, especially, is not extinguished.

The main disadvantage of the above known method and device is high probability of accidental self-ignition of the air-and-fuel cloud even before operation of the detonating charge.

It happens due to the fact that in the fire zone, especially in its center, the temperature gradients and the rate of air streams have a random character that prevents formation of an air-and-fuel cloud of a stoichiometric ratio and complicates the choice of a delay of blasting the detonating charge.

At best, incomplete detonation occurs, and more often it leads to explosion of the air-and-fuel mixture that cause an artificially created center of fire and results in fire strengthening.

Besides, during successful detonation of fine air-and-fuel cloud and creation of an air shock wave, the action of the latter is not supported by additional cooling and insulation of the fire zone because of the absence of fire-extinguishing agents. Therefore, the processes accompanying the fire and promoting its development and expansion (heating, frying, pyrolysis) do not cease thereby drastically reducing the efficiency of the given method.

An essential disadvantages of the known method of localization and/or suppression of a fire is creation of a fragmentation field consisting a material of fire-suppressing devices at the moment of operation of the dispersing charge that excludes a possibility of application of the method for suppression of a fire in urban conditions and seriously reduces safety of its application for suppression wood and forest-steppe fires and its limited use because of impossibility of its application in remote places and for suppression of large-scale fires.

A method known in the art is a method of localization and/or suppression of fires based on the effect of an air shock wave created with the help of fire-suppressing devices delivered to fire zone together with a dispersing explosive charge acted on by a control signal. The filler of the fire-suppressing devices consists of a fire-extinguishing agent. In this case, depending on the fire characteristics, means for delivery of fire-suppressing devices are selected preliminarily; a site, on which the operation of fire-suppressing devices is required, and means of delivery are determined using a parameter by which a control signal is to be sent for actuating the dispersing charge. In so doing use is made of fire-suppressing device provided with sensors of a selected parameter adjusted to a predetermined value upon reaching thereof the dispersing charge is exploded with simultaneous creation of an air shock wave formed by high-speed air pressure, products of a detonation and dispersion of a fire-extinguishing agent with formation of a fine cloud, and the size and site or sites is selected depending on the terrain, type of fire and the size of the formed fine-mist cloud of a fire-extinguishing agent (WO 98/47571).

The fire-suppressing device realizing the known method comprises a container made of pressed cardboard, a dispersing charge, a caliber stabilizer and a blasting fuse in the form of an altitude sensor and/or contact sensor with the initiators of explosion. In so doing, when using a helicopter as a delivery means, the device is placed in a special container suspended under the helicopter bottom and is fixed by a lock releasing the device by a control signal.

This known method of localization and/or suppression of a fire and a device for effecting this method provide the multiple expansion of the line of suppression of the fire while considerably reducing the surface density of a fire-extinguishing agent and also allow the firefighters to extinguish fire in remote places.

The main disadvantage of the known method of localization and/or suppression of fire is an extended period from the moment of finding the fire to the beginning of its localization and/or suppression. It is due to the fact that it is necessary to find the fire, to determine its type and size, select a site for extinguishing, to determine the parameter, upon reaching it the control signal is generated, to adjust the sensors of the fire-suppressing devices to a selected option, and then to select means for delivery fire-suppressing devices to the selected fire site.

Besides, the known method has the following essential disadvantages: it is impossible to use an army aircraft or helicopters equipped with frame holders for suspension of a bracket with a load, because they have no elements for delivery of fire-suppressing devices to a fire zone, for example, a suspension system for a frame holder that drastically reduces the efficiency of the proposed method; a low useful load factor if the delivery device is a helicopter, under whose bottom there is suspended a container with fire-suppressing devices; creation of fragmentation field consisting of metal components of the fire-suppressing device within the operative range of the dispersing charge (the coupling, boxes, charge body) that excludes a possibility of application of the given method for suppression of a fire under urban conditions and essentially reduces the safety of its application for suppression of wood and forest-steppe fires.

DISCLOSURE OF THE INVENTION

The basic object of the invention is to provide a method and a device for localization and/or suppression of fires that would allow one to extend a range of delivery devices to a center of a fire, to essentially reduce the time of their preparation for application and to eliminate a fragmentation field during the operation of the device, providing instantaneous transfer of the fire-extinguishing agent in fine-mist cloud with simultaneous action of an air shock wave on a fire zone with maximum distribution of the fire-extinguishing agent over the fire zone.

This object is attained in that the fire zone is acted on by air shock wave and a high-velocity stream of aerodispersible mixture of a fire-extinguishing agent created during the operation of the fire-suppressing device having a container with a fire-extinguishing agent and a dispersing charge, the container being equipped with structural elements providing delivery of a fire-suppressing device to a fire zone and/or installation thereof on path of fire propagation, said structural elements being separated from the container before explosion of the dispersing charge.

The structural elements providing delivery of the fire-suppressing device to the fire zone and/or installation thereof on the path of fire propagation may include, for example, a suspension system with eye-rings and with members separating it from the container at a release of the fire-suppressing device from the air carriers equipped with frame holders of a load. In addition the system may include means for installation and subsequent separation from the fire-suppressing device, when the device is installed on the path of fire propagation, said suspension system with eye-rings being used for execution of load handling operations.

The provision of the fire-suppressing device container with structural elements for delivery of this device to the fire zone and/or installation thereof on the fire propagation path allows one to provide constant availability and application of the fire-suppressing device both by air transport that provides a possibility of patrolling wood and forest-steppe areas by aircraft with fire-suppressing devices suspended and ready for use, and by ground transport when installing the fire-suppressing device on the path of fire propagation (reduces the time of cargo handling operations) thus considerably reducing the time from the moment of finding a fire to the beginning its localization.

Besides, equipping the fire-suppressing device container with structural elements providing its delivery to the fire zone and/or installation thereof on path of fire propagation, for example, a suspension system made in the form of two rings, spaced from each other and rigidly interconnected by a faceplate with eye-rings taking the load originating during transportation allows one to provide container with a stabilizer and to make the body of the dispersing charge of a thermoplastic material, which during the fire-suppressing device operation does not create a fragmentation field outside the fine-mist cloud of fire-extinguishing agent.

The separation of structural elements from the container after delivery of the fire-suppressing device to the fire zone and/or installation thereof on the path of fire propagation before the explosion of the dispersing charge allows one to eliminate intensive action of the shock wave and products of a detonation of the dispersing charge on these elements, thus excluding formation of a plurality of hard fragments during the operation of the fire-suppressing device.

The use of an aircraft for the delivery allows one to provide high probability of reaching the center of the fire by the fire-suppressing device that is important in geographically remote places such as mountains, remote sites of taiga, jungle, under no-road conditions. In this case, the separation of the structural elements from the container providing delivery of the fire-suppressing device to the fire zone is effected along the trajectory of self-contained movement of the fire-suppressing device. The proposed method enables one to extinguish a fire at places, where there is a danger of explosion is probable, high temperature is a threat to life of firemen. In so doing it is possible to use an army aircraft for delivery of the fire suppressing devices and to conduct fire extinguishing round the clock.

In the proposed method it is expedient to use ground delivery of the fire-suppressing devices in a fire area placing the latter on predetermined sites before coming nearer the fire front and to separate the structural elements from the container along the way of fire propagation by control signal prior to the explosion of the dispersing charge.

The combined action of the air shock wave and cooling and isolating effect provided by the fire-extinguishing agent guarantee reliable and quick localization of the fire thereby providing general-purpose use of the fire-suppressing devices and a wide range of application on wood, forest steppe, urban fires, for protection of territories against external fires, as well as in case of wide-scale fires in remote places. In so doing there is no losses of fire-extinguishing agent during its delivery to a fire zone providing uniform distribution of the fire-extinguishing agent on a burning surface, the presence of additional fire-extinguishing factors (high pressure, an air shock wave and a velocity head).

The object of the invention is also attained due to the fact that the fire-suppressing device realizing the method of localization and/or suppression of fires includes a container with a fire-extinguishing agent and a dispersing charge, a blasting fuse, a stabilizer and a suspension system with a releasing mechanism and elements for forced separation, said suspension system being placed on the external surface of the container symmetrically to the plane passing through the center of mass of the devices and is made in the form of elements surrounding the container, spaced from each other and rigidly interconnected by a faceplate with eye-rings, said system being connected to stabilizer bottom through a flexible link The proposed fire-suppressing device will allow one to suspend it from regular frame holders of cargo of army carriers, thus expanding a range of means of delivery. The device will provide uniform distribution of fire extinguishing agent, allow one to use a wide spectrum of fire-extinguishing agents (water, special solutions, powders), has high probability of operation on a required site of a fire zone while excluding formation of a fragmentation field outside the fine-mist cloud with a simultaneous increase of the surface of interaction of the fire-extinguishing agent with the burning material.

The mechanism for releasing the suspension system of the fire-suppressing device can be made as a sleeve with two longitudinal channels, in one of which there are located two spring-loaded pistons with rods and in the other—a gas producer with a deceleration element, said channels being closed at the ends and are connected to each other to form chambers, and each rod of the piston being movably connected to one of the elements of the suspension system enclosing the container.

Such a design of the releasing mechanism provides high reliability of separation of the suspension system from the container due to simultaneous opening of the elements of the suspension system encompassing the container, withdrawal of the fasteners encompassing the container from an operating range of the dispersing charge, installation of the suspension system on the container of the fire-suppressing device both at factory and under field conditions, safety for the air delivery craft carrying the fire-suppressing device due to exclusion of a possibility an impact of the suspension system with the structural elements of the air delivery craft.

The elements of forced separation of the suspension system from the container of the fire-suppressing device can be made as plate springs allowing one to considerably simplify the construction of the suspension system and to provide high reliability of its separation from the container.

The elements encompassing the container can be made in the form of two rings spaced from each other along a longitudinal axis and movably connected to the suspension system faceplate that will allow one to increase the useful load factor and, therefore, the efficiency of operation of the fire-suppressing device.

The container, stabilizer and the dispersing charge body of the fire-suppressing device can be made of thermoplastic polymer material that will allow one to increase the useful load factor and essentially decrease the size of drops of fire-extinguishing agent during its dispersion, and due to a high value of relative elongation of the material, the destruction of the container takes place after a considerable increase of its initial volume that results in increase of the surface of interaction of the agent with the burning material, thus increasing the efficiency of operation of the fire-suppressing device.

Besides, making the elements of the fire-suppressing device of a thermoplastic polymer material in combination with removal of the <<container housing—suspension system>> connection will allow one to eliminate the fragmentation field outside the fine-mist cloud of fire-extinguishing agent and will contribute to minimum pollution of the environment.

BRIEF DESCRIPTION OF THE DRAWINGS

The invention is further explained on a description of concrete examples carrying the invention into effect with reference to the appended drawings, in which.

THE BEST EMBODIMENT OF THE INVENTION

Figure 1:
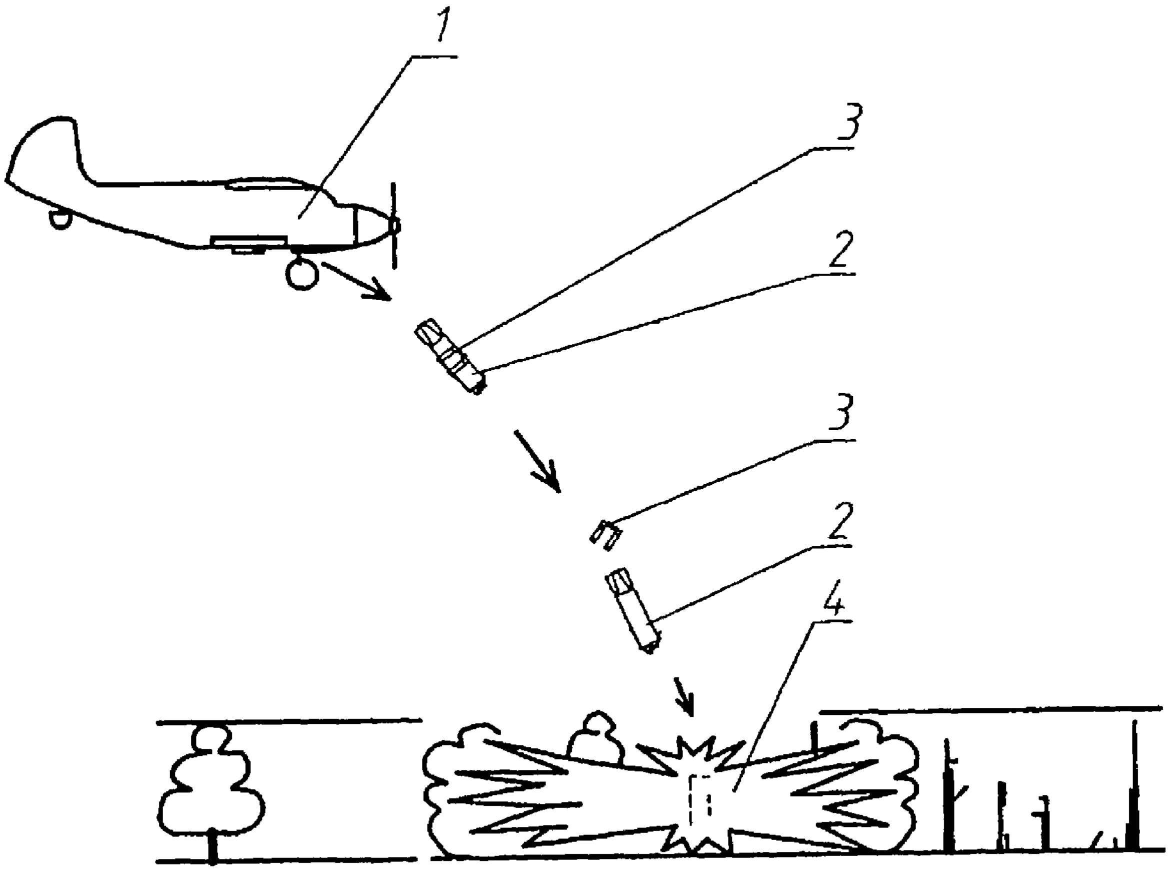
FIG. 1 is a schematic diagram of one of the embodiments of effecting the method of localization and/or suppression of fires, according to the invention, when using an aircraft as a means of delivery of fire-suppressing devices.

The method of localization and/or suppression of a fire is effected as follows.

The fire-suppressing device is assembled; the dispersing charge with a blasting fuse is installed in the container with a stabilizer, and the container is filled with a fire-extinguishing agent. Then the container is equipped with structural elements providing its delivery it to the fire zone and/or its installation on the path of fire propagation.

Depending on the embodiment of the method of localization and/or suppression of fire, the structural elements providing delivery of the fire-suppressing device to the fire zone and/or its installation on path of fire propagation, may have a different design.

When the delivery is performed by air carriers with frame cargo holders, these structural elements consist of a suspension system having elements encompassing the container with a fire-extinguishing agent and a connecting faceplate with eye-rings, allow one to suspend a fire-suppressing device from the frame cargo holders.

When the delivery is performed by ground vehicles to a fire-protected territory, the structural elements providing the delivery of the fire-suppressing device and its installation on path of fire propagation may include a suspension system having elements, encompassing the container with a fire-extinguishing agent, their faceplate with eye-rings used for shipment by the ground vehicle and a lattice girder for installation the fire-suppressing device on the path of the fire propagation.

The elements encompassing the container with a fire-extinguishing agent may be any well-known structural elements, for example, round bands.

The structural elements providing the delivery of the fire-suppressing devices to the fire zone and/or installation of the same on the fire propagation path separate from the container with a fire-extinguishing are separated from the container with a fire-suppressing agent prior to the explosion of the dispersing charge.

When throwing the fire-suppressing devices in a fire zone from the air carrier, the separation of the structural elements providing a suspension bracket of the fire-suppressing device to the frame holder of the cargo from the container is effected on a trajectory of self-contained flight of the fire-suppressing device.

When installing the fire-suppressing device on the path of fire propagation, the separation from the container of structural elements providing delivery of the fire-suppressing device to the fire zone and installation thereof on path of fire propagation is effected by the operator's command.

Shown in the drawing (FIG. 1) is an aircraft 1, carrying the cargo frame holders of the fire-suppressing device 2 provided with structural elements providing delivery it to a fire zone, which in this case are carried by a suspension system 3.

The fire-suppressing devices are released above the fire zone, and the suspension system 3 is separated on the trajectory of flight of these devices. At the impact with the ground the dispersing charge explodes, and in the fire zone there is formed a fine-mist cloud of a fire-extinguishing agent 4 with simultaneous production of an air shock wave accompanied by a velocity head of air and detonation products.

Figure 2:
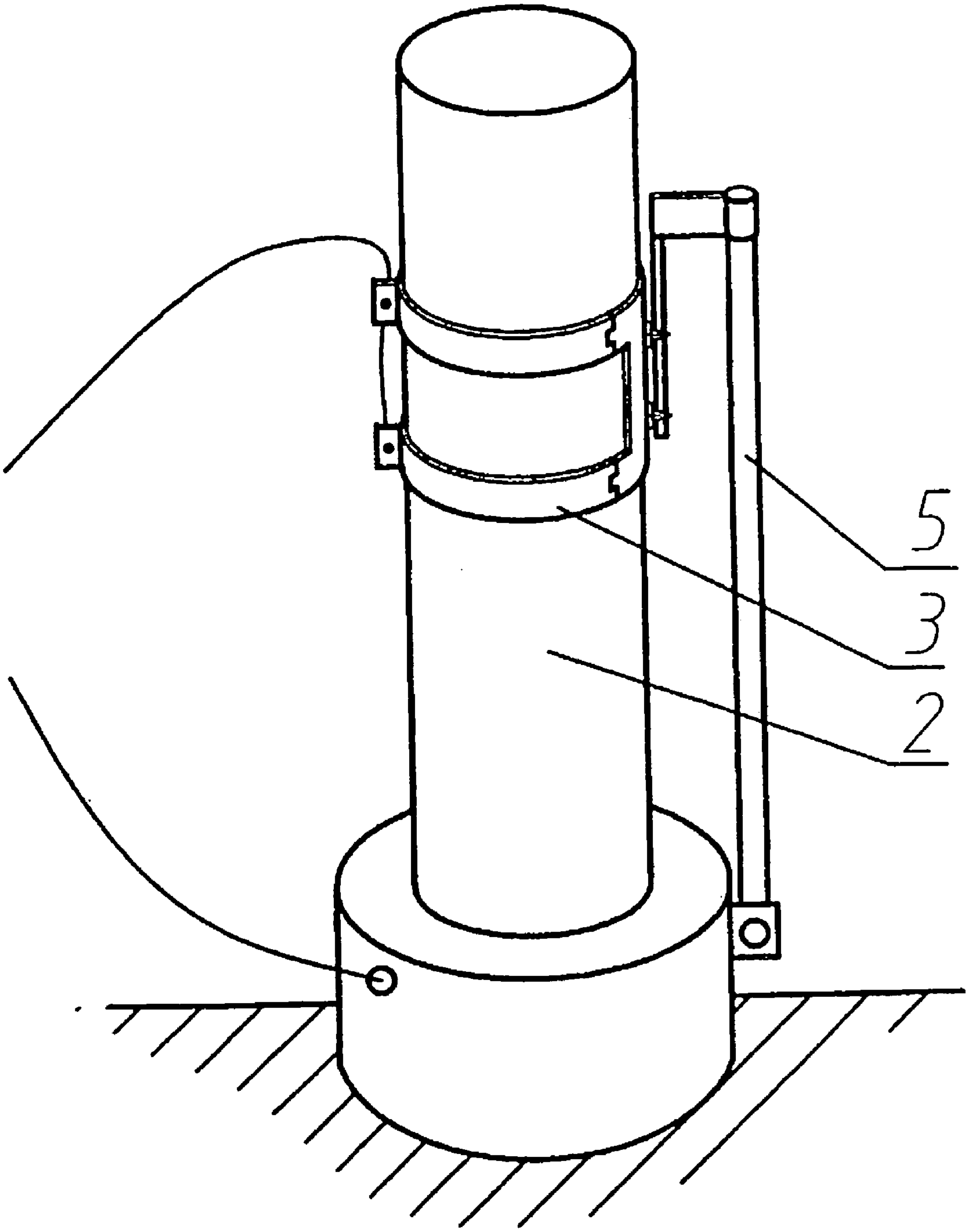
FIG. 2 is the same, according to the invention, when using a ground carrier for delivery of the fire-suppressing devices.

In the drawing (FIG. 2) there is schematically shown another embodiment of the method, when it is necessary to protect objects against an external fire. In this case use is made of ground means of delivery of fire-suppressing devices 2, arranging the latter on predetermined sites in front of expected fire line.

In this embodiment of effecting the method the main purpose is protection of a territory against an external fire, for example, wood or forest-steppe fire. There are territories located in a wood or steppe, on which military objects, villages, forest-parks, oil-extracting enterprises and other economical objects are allocated. Their protection against an external fire consists in the following.

Prior to loading a fire-suppressing device 2 onto a ground vehicle, it is equipped with structural elements providing its delivery to the fire zone, for example, a suspension system 3 with eye-rings. Using a hoisting mechanism and the eye-rings of the suspension system 3, the fire-suppressing device is installed on the vehicle and transported to a place of protection of the object against possible external fire.

In a threaten period at a high probability of fire, the perimeter of the protected territory (possibly only in the threatening directions) the fire-suppressing device 2 are installed in a vertical position with additional use of individual elements, for example, farms 5. Electric wires are led from the operator to the separate elements (suspension system, farm) and to the dispersing charge.

The interval between the fire-suppressing devices is selected equal to the diameter of the fine-mist cloud of a fire-extinguishing agent.

In the case of movement of the fire towards the protected, the operator sends a command for separation of the structural elements from the container providing delivery and installation of the fire-suppressing device on path of fire propagation, and dispersing charge operates.

During the operation of the dispersing charge a fine-mist cloud is formed in the fire zone of fire-extinguishing agent with simultaneous creation of an air shock wave accompanied by a high-velocity air head and detonation products.

The operation of the proposed fire-suppressing device 2 is explained on an example when using this device for extinguishing wood fires.

When extinguishing wood fires in remote areas, as well as large-scale fires covering hundreds square kilometers of woods, it is expedient to use air delivery of the fire-suppressing devices, which are suspended from the frame cargo holders of a plane or a helicopter and transported to the fire areas, as it is shown in FIG. 1.

The delivery of the fire-suppressing devices can be also effected by air transportation means, which are not equipped with frame cargo holders, in which case the fire-suppressing device is placed, for example, in a shipping container, which is suspended under the fuselage of the delivery plane.

When extinguishing a wood fire, it is important to stop its front and not to allow the fire to go on further, i.e. the fire must be localized. For this purpose, the fire-suppressing devices are thrown along the fire front within a determined time interval whose value depends on the speed of the delivery means and the diameter of the fine-mist cloud of fire-extinguishing agent.

Figure 3:
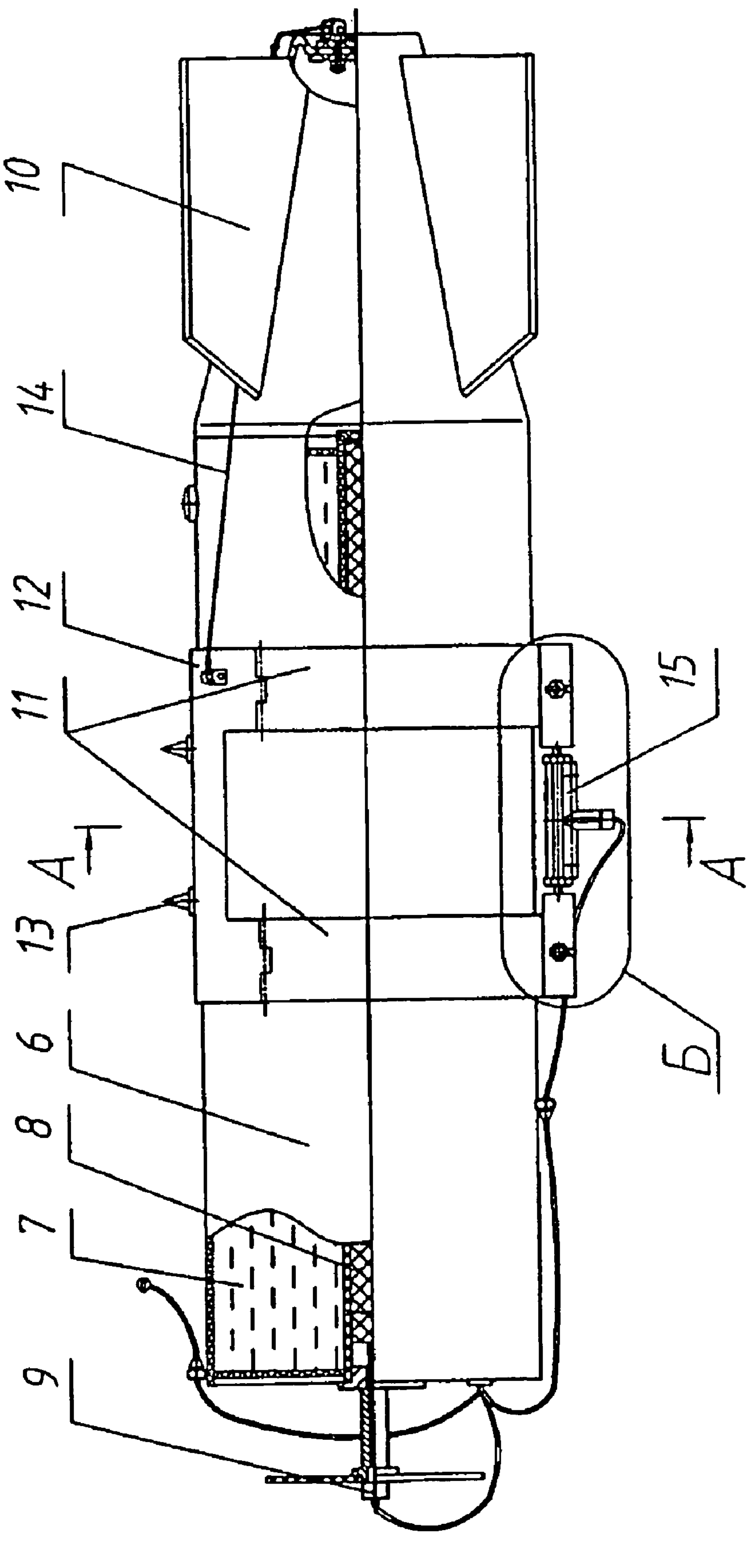
FIG. 3 is a schematic diagram of the proposed fire-suppressing device, according to the invention.

The fire-suppressing device 2 (FIG. 3) includes a container 6 with a fire-extinguishing agent 7 and a dispersing charge 8, a blasting fuse 9, a stabilizer 10, a suspension system made in the form of two elements 11 encompassing the container 6, and a faceplate 12 with eye rings 13.

The faceplate 12 of the suspension systems is connected through a flexible link 14 to the bottom of the stabilizer 10.

Figure 4:
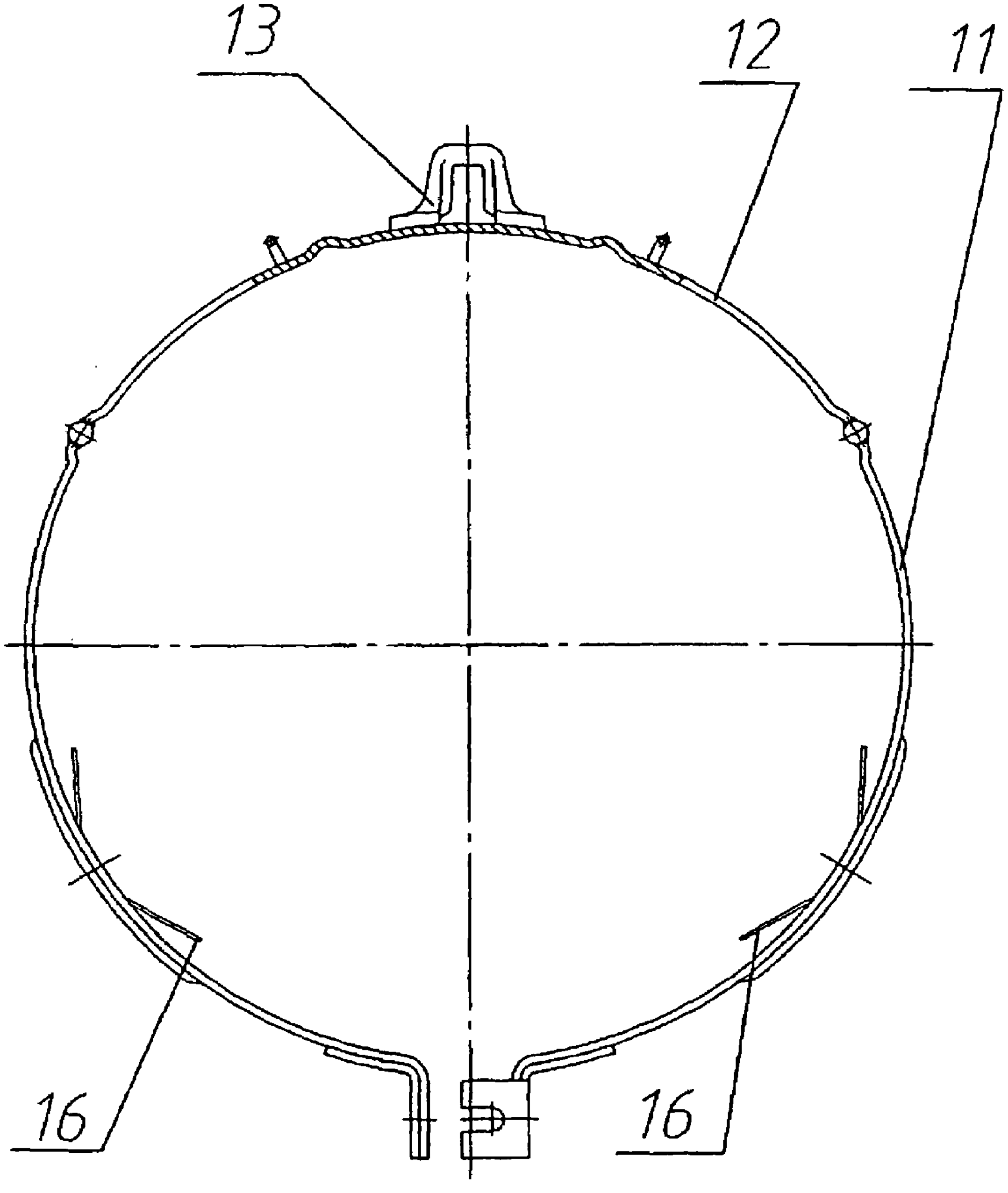
FIG. 4 is a picture of the suspension system with elements of forced separation, according to the invention.

The suspension system is provided with a releasing mechanism 15 and elements for forced-separating 16 from the container 6, for example, reed springs (FIG. 4).

Figure 5:
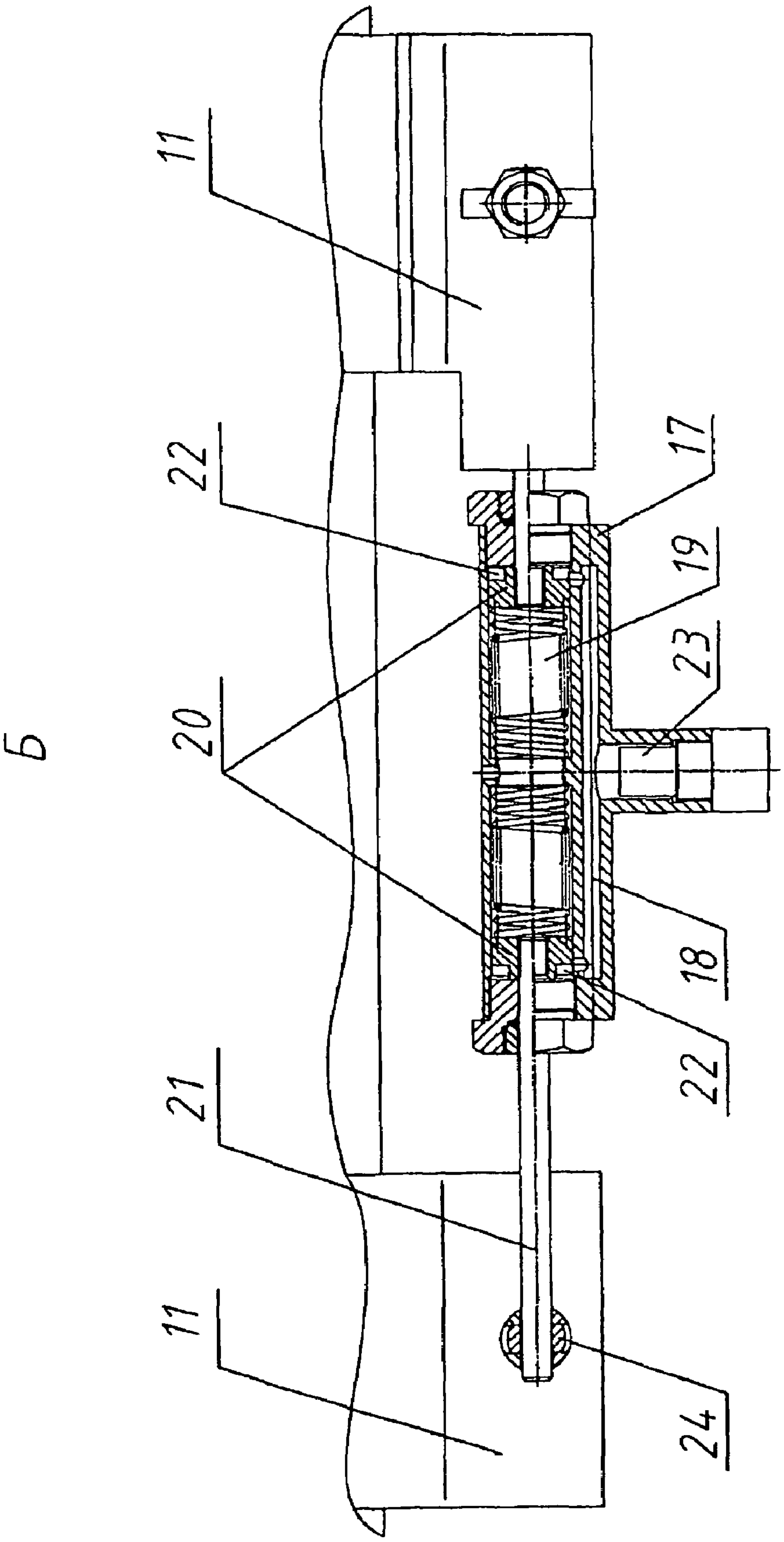
FIG. 5 is a releasing mechanism of the suspension system, according to the invention.

The releasing mechanism 15 (FIG. 5) has a sleeve 17 with two longitudinal channels 18 and 19, two spring-loaded pistons 20 with rods 21, a chamber 22, and a gas producer 23 with deceleration elements.

The elements 11, encompassing the container 6 are interconnected by fasteners 24.

The fire-suppressing device to be thrown from an air delivery means equipped with frame cargo holders operates as follows.

The control signal from the sensor unlocks the lock of the frame cargo holder, then the eye rings 13 of the suspension systems disengage, and the fire-suppressing device is separated by gravity from the air delivery unit, in so doing an electric pulse is applied to the electric igniters of the blasting fuse 9 and gas producer 23.

After some time the blasting fuse 9 is ready to action, and the gas producer 23 operates. The powder gases of the gas producer 23 come into the chambers 22 through the channel 18 of the sleeves 17. Under the force of the powder gases the pistons 20 with rods 21 moves from the holes of fasteners 24, connecting the elements 11, encompassing the container 6, releasing the link of the suspension system with the container.

Under the effect of the reed springs 16 and incoming air flow the suspension system moves beyond the bottom of the stabilizer 10 and continues movement with flexible link 14 with together with the fire-suppressing device.

When the fire-suppressing device meets the ground (or a crone of trees), the blasting fuse 9 operates and its detonation pulse acts on the explosive material directly or through a transfer charge of dispersing charge 8.

The detonation wave formed as a result of explosion of the dispersing charge 8 and the products of explosion rise the pressure in the container 6 by a hundred thousand times thereby destroying the container and throwing the fire-extinguishing agent 7. In the process of movement the fire-extinguishing agent 7 is disintegrated into drops having a size of several dozens of microns thus increasing the surface of interaction of the fire-extinguishing agent with the burning material. The expansion of the products of explosion of the dispersing charge 8 forms an air shock wave, which moves at supersonic velocity ahead of the fine-mist cloud 4 of the fire-extinguishing agent 7.

The mechanism of localization and/or suppression consists in simultaneous action of a strong shock wave, high-velocity air head and fire-extinguishing agent on the fire center, in which case the first two factors force down the flame and remove the burning material, and the fire-extinguishing agent cools the area and isolates the burning material ceasing pyrolysis and heating of the environments.

INDUSTRIAL APPLICABILITY

The invention is intended for extinguishing large-scale and powerful fires with danger of explosion and development of high temperature of burning. The application of the proposed method and fire-suppressing device allows one to significantly increase the efficiency and safety of localization and/or suppression of fires.

Reduction of time for preparation and provision of constant availability of fire-suppressing devices to application, extension of a range of means of delivery, a possibility of patrolling wood and forest-steppe areas by air delivery means with frame cargo holders, from which fire-suppressing devices are suspended, the absence of fragments during the operation of the fire-suppressing device, a possibility of round-the-clock fire extinguishing in a combination with the absence of losses of the fire-extinguishing agent at its delivery to the fire zone, uniform distribution of the fire-extinguishing agent over a burning surface, a calculated action of the fine-mist cloud of fire-extinguishing agent, elevated pressure of an air shock wave and high velocity head—all this makes it possible to much reduce the cost of localization and suppression of fires.

One of the significant factors influencing the main application of the proposed invention is its universality expressed in a possibility of using both air and ground means of delivery of the fire-suppressing device to the fire zone, its use both in urban and in field conditions, an assembly of the fire-suppressing devices both under factory and field conditions.

The invention claimed is:

1. A method of localization and/or suppression of a fire using an air shock wave and high-velocity flow of an aero-dispersible mixture of a fire-extinguishing agent, the method comprising:

providing a fire-suppressing device having a dispersing charge, a container, and a fire-extinguishing agent, characterized in that the container is equipped with a suspension system with a release mechanism;

and aerially delivering the fire-suppressing device to a fire zone; wherein the suspension system remains attached to the fire-suppressing device for a duration of time prior to exploding the dispersing charge using a flexible link when delivered by a vehicle, and separating the suspension system from the container after a duration of time prior to exploding the dispersing charge;

wherein said suspension system being disposed on the external surface of the container symmetrically to the plane passing through the center of mass of the device and encompassing the container, and said suspension system comprises structural elements space from each other and rigidly interconnected by a faceplate with eye-rings and connected to the stabilizer through said flexible link;

wherein said releasing mechanism is made in the form of a sleeve with two longitudinal channels closed at the ends and connected to each other forming chambers, one of which accommodating two spring-loaded pistons with rods, each of which is movably connected to one of the structural elements and the other channel accommodating a gas producer.

2. The method of localization and/or suppression of the fire as claimed in claim 1, characterized in that during the aerial delivery of the fire-suppressing device said suspension system separates from the container along the trajectory of self-contained movement of the fire-suppressing device.

3. The method of localization and/or suppression of the fire as claimed in claim 1, characterized in that the installation of the fire-suppressing device on the path of fire propagation and the separation of said suspension system from the container are effected by an operator's command prior to the explosion of the dispersing charge.

4. The method of localization and/or suppression of the fire as claimed in claim 2, characterized in that during the separation of said suspension system from the container, said suspension system is imparted an additional running speed relative to the running speed of the container.

5. A fire localization and/or suppression device, comprising a container, a fire-extinguishing agent, a dispersing charge, a blasting fuse, a stabilizer, a suspension system with a releasing mechanism and forced-separating elements, wherein said suspension system being disposed on the external surface of the container symmetrically to the plane passing through center of mass of the device and encompassing the container, and said suspension system comprises structural elements spaced from each other and rigidly interconnected by a faceplate with eye-rings and connected to the stabilizer through a flexible link;

wherein said releasing mechanism is made in the form of a sleeve with two longitudinal channels closed at the ends and connected to each other forming chambers, one of which accommodating two spring-loaded pistons with rods, each of which is movably connected to one of the structural elements and the other channel accommodating a gas producer.

6. The fire localization and/or suppression device as claimed in claim 5, characterized in that it contains forced-separating elements for forced separation of the suspension system from the container comprising reed springs.

7. The fire localization and/or suppression device as claimed in claim 5, characterized in that the structural elements include two bands spaced from each other along a longitudinal axis and movably connected to the faceplate of the suspension system.

8. The fire localization and/or suppression device as claimed in claim 5, characterized in that the container, the stabilizer and the body of the dispersing charge are made of a thermoplastic polymer material.

9. A method of localization and/or suppression of a fire using an air shock wave and high-velocity flow of an aero-dispersible mixture of a fire-extinguishing agent, the method comprising:

providing a fire-suppressing device having a dispersing charge, a container with a fire-extinguishing agent, and a suspension system with a release mechanism;

installing the device on a path of fire propagation in front of an expected fire line; and separating the suspension system from the container prior to exploding the dispersing charge;

wherein said suspension system being disposed on the external surface of the container symmetrically to the plane passing through the center of mass of the device and encompassing the container, and said suspension system comprises structural elements space from each other and rigidly interconnected by a faceplate with eye-rings and connected to the stabilizer through a flexible link;

wherein said releasing mechanism is made in the form of a sleeve with two longitudinal channels closed at the ends and connected to each other forming chambers, one of which accommodating two spring-loaded pistons with rods, each of which is movably connected to one of the structural elements and the other channel accommodating a gas producer.

* * * * *